May 3, 1960             R. W. LITTLE             2,934,859
TREE INJECTOR WITH TRIGGER CONTROLLED VALVE
Filed April 20, 1959
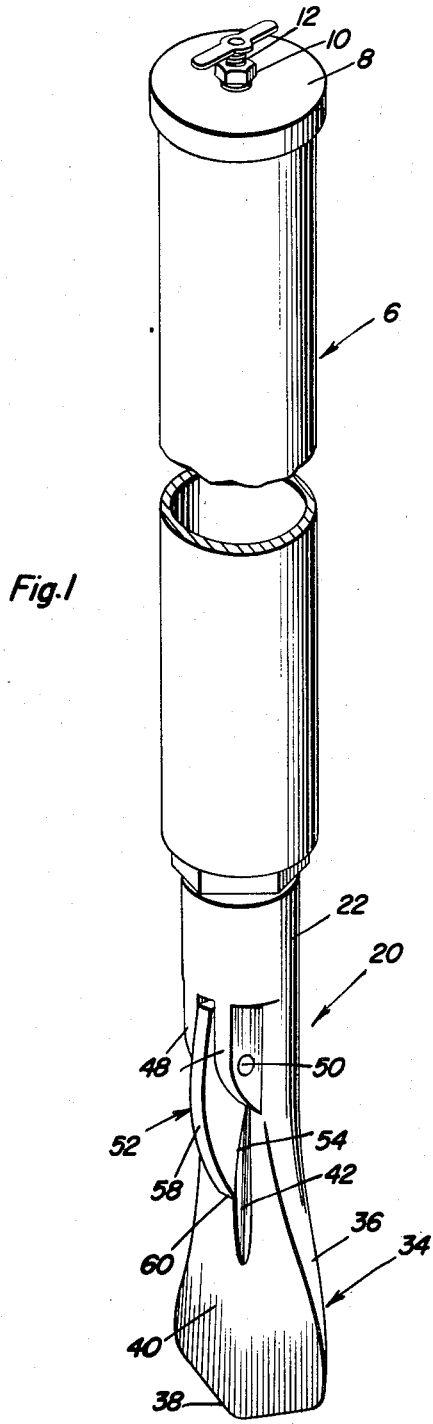
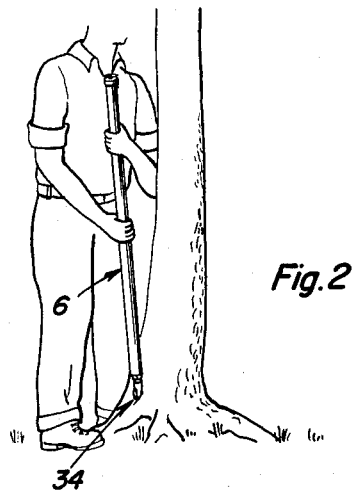
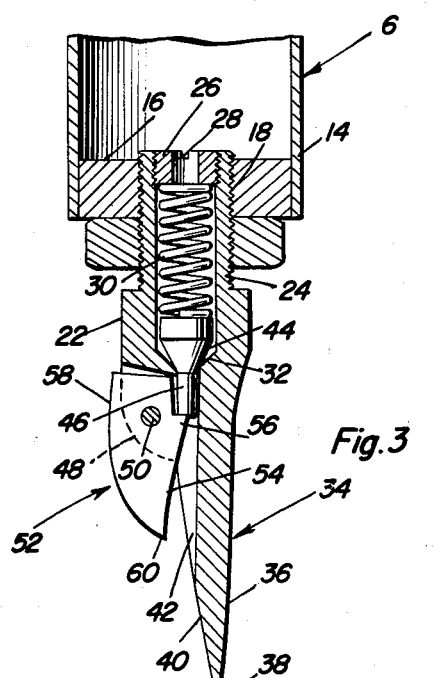
Reuel W. Little
INVENTOR.

United States Patent Office 2,934,859
Patented May 3, 1960

2,934,859

TREE INJECTOR WITH TRIGGER CONTROLLED VALVE

Reuel W. Little, Madill, Okla.

Application April 20, 1959, Serial No. 807,644

9 Claims. (Cl. 47—57.5)

The present invention relates to certain new and useful improvements in a tree injector of a type which is characterized by a vertically elongated barrel containing an appropriate fluid chemical which may be injected into the base of a tree to kill the tree and prevent subsequent sprouting, said barrel being provided on its lower or leading end with a penetrating bit which may be forcibly driven into the tree, and a triggered valve for regulating and controlling the amount of the fluid chemical discharged.

Many and differing injectors have been evolved and produced by others and numerous patents have issued on tree injectors and inoculators. As exemplary of the state of the art to which the present invention relates reference may be made to prior Patents 2,770,920 of November 20, 1956, and 2,803,924 of August 27, 1957. Take for example the tree injector in Patent 2,770,920. It will be observed that this comprises a bark cleaving blade forming a part of a bit having a wedge-like body portion provided with a fluid passage, a leading knife-like cutting edge, and front and back sides, the front side having a centralized fluid pooling cavity therein and the discharge end of said passage communicating with and emptying into said cavity, a bored body having a dispensing valve and separably coupled to the trailing end of the body portion of said blade and adapted, when the valve is open, to deliver a prescribed charge of fluid chemical into said passage for gravitation into the cavity. A vertically elongated barrel is separably but communicatively joined at its lower end with the upper end of said bored body and is adapted to contain the fluid chemical for injection into the fibers of the tree. The blade, bored body and barrel are conjointly of predetermined weight to permit the user to literally "throw" the injector, while still holding it, toward a selected spot at the base of a tree in a manner to forcibly land and drive the blade through the outer bark and into the cambium layer and to thus cleave a pocket into which a prescribed amount of the fluid chemical is fed in a manner to impregnate the tree. Remote controlled trip means for the valve is mounted accessibly on the upper side of the upper portion of the barrel and upper handle means is fixed on said one side and situated downwardly from the top of the barrel and is adapted to accommodate the right hand of the user. Lower handle means for the left hand is mounted on the lower half portion of the barrel just above the blade and is designated and serves to enable the user to aim, guide and forcibly land the blade at the spot which is to be penetrated and injected with the fluid.

The above general explanation will acquaint the reader with the general nature of the invention which is hereinafter disclosed, described and claimed. In this connection it is to be noted that the valve means is remote controlled and in fact hand-operated. It often happens that because of the amount of work involved and the kind of men who are employed and although the tree is jabbed, neither the desired pocket is made nor the desired amount of fluid chemical is injected. This result is traceable to the use of the implement in inexperienced hands, because of the fact that the user may not bother to do the intended job right. Manifestly, this has posed a problem which, in turn, has given rise to the instant concept, that is the incorporation in the bit of an automatically tripped and controlled valve.

It follows that an objective in the instant achievement is to not only provide a differently designed and positive acting cutting blade but to associate the valve tripping and chemical feeding means directly and intimately with the front of the blade, that is the side of the blade which is stabbed into the base of the tree. Once the blade is forcibly driven home and the desired depositing pocket is formed it necessarily follows that during the same cycle of operation a pivoted trigger, which is close to the bit, is forcibly pressed against the tree and trips and opens the valve, making sure that the cleaved pocket is charged with the fluid chemical. Briefly summarized, in carrying out the invention I provide an elongated barrel of a length that it may be caught hold of and used by a standing user, lifted and then plunged forwardly and downwardly at the desired angle toward the base of a tree, said barrel being of predetermined weight to properly land against the surface of the tree with the driving force required, said barrel also providing a reservoir for the fluid chemical with which it is adapted to be loaded, and a bit operatively mounted on the lower leading end of said barrel, said bit embodying a bark penetrating and cleaning blade and a bored body communicatively and operatively joining said blade with said barrel, a normally closed fluid releasing and controlling valve operatively mounted in the bore of said body, and trigger means carried by said bit for tripping said valve to an open fluid-releasing position, said means being situated above the cutting edge of the blade and being pushed, by the operator, against the tree surface after the blade has been forcibly landed and driven into the tree, whereby after the desired pocket is formed in the tree the trigger is forcibly pushed against the tree and the fluid is controllably discharged into the pocket.

Approached from a slightly different point of view it can be said that the improved injector is characterized by a bit embodying a body portion provided at the upper end thereof with a reduced attaching and coupling neck, said neck providing a fluid trapping passage and said passage extending down and into said body portion and terminating in a valve seat, said seat having a fluid discharge opening, a bark penetrating and cleaving blade integrated with the bottom of the body portion and having a front surface in alignment with said opening, said front surface having a fluid concentrating and channeling groove terminating short of the cutting edge of the blade, a spring-pressed valve mounted in said passage and closed against said seat, and trigger means operatively mounted on said body portion and adapted to engage and unseat the valve after the blade has been forcibly driven into the base of a tree, and an elongated barrel, the lower end of which is operatively joined to said neck.

Then, too, novelty is predicated not only on the combination of the properly constructed and functioning barrel with the bit, but also on the bit as an improved unit or part, particularly wherein an appropriately contoured cutting blade is located concentrically to one side of the discharge opening and flanges or ears are located on a diametrically opposite side of the discharge opening, the ears being disposed on opposite sides of the intervening fluid guiding channel, said ears being located at the bottom of the body portion, and a trigger comprising a simple block-like element with a properly located triggering shoulder for the trip pin and a curvate outer edge providing the desired tree-surface engaging means.

Other objects, features and advantages will become more readily apparent from the following description and the accompanying illustrative, but not restrictive drawing.

In the drawings, wherein like numerals are employed to designate like parts throughout the views:

Fig. 1 is a fragmentary perspective view of a tree injector with the automatic trigger controlled valve constructed in accordance with the principles of the present invention.

Fig. 2 is a view on a relatively small scale showing the manner in which a user has plunged and driven the bit into the base of the tree which is to be injected.

Fig. 3 is a view on a relatively large scale with parts in section and elevation detailing the ever important bit, as an entity, and the manner in which it is constructed and mounted in the lower part of the barrel.

With reference now to the drawing and particularly to Fig. 1 it will be seen that the aforementioned barrel is denoted by the numeral 6. There is a suitable closing cap 8 on the upper end thereof centrally provided with a fitting 10 screwed or otherwise mounted and which in turn is provided with a venting valve 12. Manifestly, any capping and air venting means may be utilized, this being no significant part of the instant invention. However, it is to be mentioned that the barrel is of course of a length to provide the necessary reach for use by a man of average height while standing up, the necessary length while it is being lifted and vigorously plunged forwardly and downwardly at the requisite angle in the direction of the base of the tree shown for instance in Fig. 2. The barrel should be of a weight that is neither too light nor too heavy for its intended ram-like driving stroke. The barrel is also used as a reservoir for the liquid chemical, whether the chemical be used as a tree deadener or for the promotion of growth of the tree.

As better shown in Fig. 3 the lower end portion has a ring nut or an appropriate adapter collar 16 securely fastened therein and provided centrally with a screw-threaded hole 18. This is the means which serves to accommodatingly attach the improved bit 20 to the barrel. As already mentioned, the bit, broadly construed embodies a bark penetrating and cleaving blade and a bored body communicatively and operatively joining said blade with the barrel. A normally closed fluid releasing and controlling valve is operatively mounted in the bore of the body. Means is embodied in the bit for timely but positively triggering the valve to an open fluid releasing position. This means must be such that it functions as a trigger so that when it is forcibly pressed into contact or engagement with the hard surface of the tree right after the blade has been forcibly landed, it results in lifting and forcing the valve open. More specifically, the bit comprises a body portion 22 having an axial bore extending therethrough with the bore aligned with a communicating bore in the reduced screw-threaded neck 24. This neck is screwed into the ring nut by way of the opening 18 and the upper end of the bore or passage therein is provided with a smaller ring nut 26 having screwdriver kerfs 28. This nut serves as a retainer for the upper portion of a coil spring 30 which is located in the bore. This bore may be referred to as a fluid discharge passage. The lower end thereof is conical and suitably shaped to provide a valve seat 32 and the valve seat is centrally provided with a discharge opening. In practice the exterior surface of the body portion may be flat-faced to provide a tool gripping nut (not shown). The cutting blade, which is an integral part of the bit, is denoted by the numeral 34 and it is eccentrically integrated with the bottom of the body portion and is of appropriate length and design. The back or rear surface may be denoted at 36 and the cutting edge at 38. The cutting edge is preferably of the V-shaped construction seen in Fig. 1. The front face of the cutting blade is denoted at 40 and it will be noticed that at the center of the portion of the blade which joins the body portion I provide a lengthwise groove 42 which communicates with the discharge opening and which serves to deliver the chemical into the pocket which is subsequently to be formed in the tree in the manner seen in Fig. 2. The spring-loaded or spring-biased valve is denoted at 44 and it is confined in the passage and has a depending trip pin 46 which extends downwardly through and beyond the discharge opening and into the upper end of the groove or channel 42. Diametrically opposite the blade the bottom portion of the body portion is provided with a pair of upstanding spaced parallel ears 48. These ears are lined up with or opposed to the intervening channel 42. They serve to accommodate a pivot pin 50 which, in turn, serves to mount the trigger 52 between the ears. The trigger (Fig. 3) is a cam, but may also be described as a block-like element having an inner suitably shaped lengthwise edge 54 and a suitably cut shoulder 56 which is lined up with and engages the trip pin 46. The outer curvate lengthwise edge 58 in conjunction with the leading point 60 at the bottom provides the cam which, obviously, the user rams or pushes against the tree and trips the trigger immediately after properly injecting the tree, which action, in turn, engages the trip pin 46, unseats the valve 44 and allows the chemical fluid to pass down through the passage and into the groove 42 and then into the pocket which has been formed in the base of the tree. As is perhaps evident in making the injection the workman literally throws the cleaving bit into the base of the tree. Obviously, he is only guiding the injector, thus taking no jar from the impact. If for instance the tree is large with thick outer bark, the workman merely raises the injector higher and naturally throws it down more rapidly. On the other hand, if the tree is thin-barked or small, it is only necessary to drop the injector down into the base of the tree. By the same token, if the job involves a small bush, a shorter drop is all that is necessary. At the same time, it is necessary to be sure that the cutting blade of the bit drives through the outer bark into the cambium layer or inner bark. It stands to reason that after a user has had experience and practice it is easy to "throw" the cutting blade into the tree hard then it would be to simply force down on the handle and try to push it into the fibers of the tree. Of course in the event of doubt the idea is to hit the tree harder. The blade will penetrate the bark and fibers and form a pocket which in turn will trap the fluid until the sap takes it into the roots and leaves the tree. Experience has shown that it is easier and in fact faster to speed up the thrust if the user is merely guiding or holding the injector at the point of impact. Instead of having to trip the valve by hand, as is done in my prior patents, it is obvious that here the valve is triggered open as the workman leans forward and pushes slightly after having cut the desired pocket. The fluid gravitates and is channeled into the pocket to do the desired job.

Practice is of course needed to operate the implement with requisite ease. The angle at which the bit or cutting blade strikes is of course important. That is to say if the tool is held to nearly vertical the bit tends to glance off or cut only through the bark. If it is held too flat it does not cut deeply enough. Users soon learn the correct angle to make a chiseling cut deep into the fibers of the tree. It is also sometimes desirable to rock the driven blade in the pocket to make sure that the trigger has struck the tree's surface and the valve has been opened. Here again experience is the best teacher.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A tree injector comprising a bit embodying a body portion provided at the upper end thereof with a reduced attaching and coupling neck, said neck providing a fluid trapping passage and said passage extending down and into said body portion and terminating in a valve seat, said seat having a fluid discharge opening, a bark penetrating and cleaving blade integrated with the bottom of the body portion and having a front surface in alignment with said opening, said front surface having a fluid concentrating and channeling groove terminating short of the cutting edge of the blade, a spring-pressed valve mounted in said passage and closed against said seat, and trigger means operatively mounted on said body portion and adapted to engage and unseat the valve after the blade has been forcibly driven into the base of a tree, and an elongated barrel the lower end of which is operatively joined to said neck.

2. The structure defined in claim 1, and wherein said neck is screw-threaded, said barrel being provided at said lower end with a ring-nut plugged and fixed in said lower end and said neck being screwed into said ring-nut.

3. A tree injector comprising a bit embodying a body portion provided at the upper end thereof with a reduced attaching and coupling neck, said neck providing a fluid trapping passage and said passage extending down and into said body portion and terminating in a valve seat, said seat having a fluid discharge opening, a bark penetrating and cleaving blade integrated with the bottom of the body portion and having a front surface in alignment with said opening, said front surface having a fluid concentrating and channeling groove terminating short of the cutting edge of the blade, a spring-pressed valve mounted in said passage and closed against said seat, and trigger means operatively mounted on said body portion and adapted to engage and unseat the valve after the blade has been forcibly driven into the base of a tree, said trigger means comprising a cam-like member which is pivotally mounted on said body portion, said member having a shoulder, said valve having a depending trippin spring-biased into cooperating engagement with said shoulder.

4. For use on the lower leading end of a vertically elongated fluid containing tree injector barrel; a special purpose bit comprising a body portion provided at the upper end thereof with a reduced attaching and coupling neck, said neck providing a fluid trapping passage and said passage extending down and into said body portion and terminating in a valve seat, said seat having a fluid discharge opening, a bark penetrating and cleaving blade integrated with the bottom of the body portion and having a front surface in alignment with said opening, said front surface having a fluid concentrating and channeling groove terminating short of the cutting edge of the blade, a spring-pressed valve mounted in said passage and closed against said seat, said valve having an axial depending trip-pin extending downwardly through and below said opening, said blade being joined eccentrically to the bottom of the body portion on one side of said opening, the bottom of said body portion having a pair of ears located eccentrically on a diametrically opposite side of the opening and aligned with the then intervening groove, and a trigger pivotally mounted between said ears and cooperatively engageable with said trip-pin.

5. The structure defined in claim 4, and wherein said trigger comprises a block-like element having a shoulder at an inner edge engaging said trip and a curvate outer lengthwise edge.

6. A tree injector comprising an elongated barrel of a length that it may be caught hold of and used by a standing user, lifted and then plunged forwardly and downwardly at the desired angle toward the base of a tree, said barrel being of predetermined weight to properly land against the surface of the tree with the driving force required, said barrel also providing a reservoir for the fluid chemical with which it is adapted to be loaded, and a bit operatively mounted on the lower leading end of said barrel, said bit embodying a bark penetrating and cleaving blade and a bored body communicatively and operatively joining said blade with said barrel, a normally closed fluid releasing and controlling valve operatively mounted in the bore of said body, and means embodied in said bit for triggering said valve to an open fluid-releasing position, said means being situated above the cutting edge of the blade and being adapted to engage the tree surface after the blade has been forcibly landed and driven into the tree, whereby as soon as a desired pocket is formed in in the tree and the valve is then triggered, the fluid is discharged into the pocket, said valve being spring biased against a seat provided therefor in said bore, said valve having a trip which when forcibly pressed upon unseats the valve against the action of the spring, the aforementioned means comprising a trigger.

7. The structure defined in claim 6, and wherein said trigger is located at the juncture of the base of the blade and said body.

8. The structure defined in claim 6, and wherein said valve is spring-biased against a seat provided therefor in said bore, said valve having a trip which when forcibly pressed upon unseats the valve against the action of the spring, the aforementioned means comprising a trigger, said trigger being located at the juncture of the base of the blade and body, and having a surface which, when forcibly pressed against the tree-surface, comes into play and acts upon said trip.

9. A tree injector comprising an elongated barrel of a length that it may be caught hold of and used by a standing user, lifted and then plunged forwardly and downwardly at the desired angle toward the base of a tree, said barrel being of predetermined weight to properly land against the surface of the tree with the driving force required, said barrel also providing a reservoir for the fluid chemical with which it is adapted to be loaded, and a bit operatively mounted on the lower leading end of said barrel, said bit embodying a bark penetrating and cleaving blade and a bored body communicatively and operatively joining said blade with said barrel, a normally closed fluid releasing and controlling valve operatively mounted in the bore of said body, and means embodied in said bit for triggering said valve to an open fluid-releasing position, said means being situated above the cutting edge of the blade and being adapted to engage the tree surface after the blade has been forcibly landed and driven into the tree, whereby as soon as a desired pocket is formed in the tree and the valve is then triggered, the fluid is discharged into the pocket, said valve being springbiased against a seat provided therefor in said bore, said valve having a trip which when forcibly pressed upon unseats the valve against the action of the spring, the aforementioned means comprising a trigger located at the juncture of the base of the blade and body and having a surface which, when it is pressed forcibly against the treesurface, comes into play to act upon said trip, said blade being wedge-like in shape and construction and having a front face provided with a fluid concentrating and channeling groove, said trigger being located opposite and aligned with said groove.

References Cited in the file of this patent

UNITED STATES PATENTS

| 792,189 | Banks | June 13, 1905 |
| 823,272 | Halpin | June 12, 1906 |
| 1,807,695 | Lee | June 2, 1931 |

FOREIGN PATENTS

| 251,980 | Germany | Oct. 11, 1912 |